(12) United States Patent
Miyazaki

(10) Patent No.: US 12,211,650 B2
(45) Date of Patent: Jan. 28, 2025

(54) MULTILAYER CERAMIC CAPACITOR

(71) Applicant: Murata Manufacturing Co., Ltd., Nagaokakyo (JP)

(72) Inventor: Tomochika Miyazaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 182 days.

(21) Appl. No.: 18/107,541

(22) Filed: Feb. 9, 2023

(65) Prior Publication Data

US 2023/0268121 A1  Aug. 24, 2023

(30) Foreign Application Priority Data

Feb. 22, 2022 (JP) ................................ 2022-025826

(51) Int. Cl.
| | |
|---|---|
| H01G 4/012 | (2006.01) |
| H01G 4/008 | (2006.01) |
| H01G 4/12 | (2006.01) |
| H01G 4/30 | (2006.01) |

(52) U.S. Cl.
CPC ............ H01G 4/012 (2013.01); H01G 4/008 (2013.01); H01G 4/1227 (2013.01); H01G 4/30 (2013.01)

(58) Field of Classification Search
CPC ...... H01G 4/008; H01G 4/0085; H01G 4/012; H01G 4/1227; H01G 4/2325; H01G 4/30
See application file for complete search history.

(56) References Cited

U.S. PATENT DOCUMENTS

| | | | |
|---|---|---|---|
| 6,198,618 B1 | 3/2001 | Ohtani et al. | |
| 2001/0016252 A1 | 8/2001 | Nagamoto et al. | |
| 2011/0157767 A1* | 6/2011 | Hur | H01G 4/01 361/303 |
| 2014/0002949 A1* | 1/2014 | Gu | H01G 4/12 361/301.4 |

FOREIGN PATENT DOCUMENTS

| | | |
|---|---|---|
| JP | H08162359 A | 6/1996 |
| JP | 09-007878 A | 1/1997 |
| JP | H11329073 A | 11/1999 |
| JP | 2001297628 A | 10/2001 |
| JP | 2002110444 A | 4/2002 |
| JP | 2005129424 A | 5/2005 |
| JP | 2012-109488 A | 6/2012 |

OTHER PUBLICATIONS

Office Action in JP2022-025826, mailed Mar. 19, 2024, 4 pages.

* cited by examiner

*Primary Examiner* — Nathan Milakovich
(74) *Attorney, Agent, or Firm* — Keating & Bennett, LLP

(57) ABSTRACT

A multilayer ceramic capacitor includes a multilayer body including dielectric layers, internal electrode layers, and first and second end surfaces facing each other in a length direction, a first external electrode on a side of the first end surface, and a second external electrode on a side of the second end surface. The first and second external electrodes each include lower and upper electrode layers, the lower electrode layers include a metal component and a glass component, the upper electrode layers include a metal component and a glass component, and include pores, an amount of the glass component in the upper electrode layers is less than an amount of the glass component in the lower electrode layers, and a maximum inscribed circle diameter of the pores in the upper electrode layers is greater than or equal to about 0.02 μm and less than or equal to about 0.52 μm.

20 Claims, 5 Drawing Sheets

III-III SECTIONAL VIEW

MULTILAYER CERAMIC CAPACITOR

CROSS REFERENCE TO RELATED APPLICATIONS

This application claims the benefit of priority to Japanese Patent Application No. 2022-025826 filed on Feb. 22, 2022. The entire contents of this application are hereby incorporated herein by reference.

BACKGROUND OF THE INVENTION

1. Field of the Invention

The present invention relates to a multilayer ceramic capacitor.

2. Description of the Related Art

In recent years, for a multilayer ceramic capacitor, improvements in board bending resistance and moisture resistance have been required. The board bending resistance is an important characteristic for ensuring reliability of the multilayer ceramic capacitor after mounted on a circuit board. A conventional multilayer ceramic capacitor is temporarily fixed on a circuit board with pre-applied adhesive, and then is mounted by connecting and fixing, with solder, an external electrode on a land pattern formed on the circuit board.

However, the above-described configuration involves a problem leading to conduction failure or insulation resistance failure because the board bending resistance is relatively weak and cracks are likely to occur due to breakage, warpage, or the like of the circuit board after mounting.

As a solution to the board bending resistance, for example, a ceramic electronic component described in Japanese Patent Laying-Open No. H9-7878 has been proposed.

The ceramic electronic component proposed in Japanese Patent Laying-Open No. H9-7878 includes a ceramic body (multilayer body) and external electrodes provided at both ends of the ceramic body. The external electrodes each include at least two layers. A content of glass in a first layer connected to the ceramic body is greater than a content of glass in a second layer on the first layer.

With the above configuration, structurally, the first layer has high adhesion to the ceramic body and the second layer has a low adhesive property to the ceramic body. As a result, tensile stresses generated at the time of board bending can be reduced between side surfaces of the ceramic body and the second layers, and thus the board bending resistance can be improved accordingly.

Additionally, in solder-mounting an electronic component such as a multilayer ceramic capacitor, a solder-mounting method using a water-soluble flux has been widely used.

However, such a water-soluble flux is highly erodible, and erodes glass components included in the external electrodes and reactive layers of glass in the external electrodes and a ceramic material of the ceramic body. The reactive layers are formed in interfaces between the ceramic and the external electrodes. As a result, there is a problem that a moisture infiltration path is formed from surfaces of the external electrodes or end portions of the external electrodes to an inside of the ceramic body, and the moisture resistance of the electronic component is lowered.

As a solution to the moisture resistance, for example, a multilayer ceramic electronic component described in Japanese Patent Laying-Open No. 2012-109488 has been proposed.

The multilayer ceramic electronic component proposed in Japanese Patent Laying-Open No. 2012-109488 includes a ceramic body and an external electrode formed on a surface of the ceramic body. The external electrode includes a lower external electrode and an upper external electrode. The lower external electrode is formed on the surface of the ceramic body, and includes glass in which a content of an alkaline earth metal is in a range of 37 to 45 mol %. The upper external electrode is formed on the lower external electrode, and includes glass in which a content of $SiO_2$ is in a range of 50 to 55 mol %. A proportion of glass in an inorganic solid content included in the lower external electrode is in a range of 17 to 25 vol %. A proportion of glass in an inorganic solid content included in the upper external electrode is in a range of 5 to 18 vol %.

With the above configuration, the upper external electrode including $SiO_2$ in the above proportion can ensure erosion resistance of the external electrode against the water-soluble flux, and the lower external electrode including the alkaline earth metal in the above proportion and hardly causing a reaction with the ceramic material of the ceramic body can reduce and prevent generation of a reaction product, which has low erosion resistance against the water-soluble flux, between the glass in the external electrode and the ceramic, and can improve the moisture resistance.

However, in the ceramic electronic component described in Japanese Patent Laying-Open No. H9-7878, since the first layer includes more glass than the second layer, electrolytic plating is less likely to grow and a plating solution is trapped in the external electrodes, which may cause troubles such as insulation resistance deterioration and solder burst in a moisture resistance reliability test. Thus, there is a problem that the moisture resistance of the ceramic electronic component is lowered.

Additionally, in the multilayer ceramic electronic component described in Japanese Patent Laying-Open No. 2012-109488, although the moisture resistance is solved with glass including a large amount of $SiO_2$ component, a softening point is high in the glass including the large amount of $SiO_2$, and a sintering temperature of the electrode tends to increase, so that a residual stress of the external electrode is likely to increase. Thus, there is a problem that the board bending resistance of the multilayer ceramic electronic component is likely to decrease.

As described above, in Japanese Patent Laying-Open Nos. H9-7878 and 2012-109488, it is difficult to achieve both the moisture resistance and the board bending resistance.

SUMMARY OF THE INVENTION

Therefore, preferred embodiments of the present invention provide multilayer ceramic capacitors each capable of achieving both moisture resistance and board bending resistance.

A multilayer ceramic capacitor according to a preferred embodiment of the present invention is a multilayer ceramic capacitor including a multilayer body including a plurality of dielectric layers, a plurality of internal electrode layers, a first main surface and a second main surface facing each other in a height direction, a first side surface and a second side surface facing each other in a width direction orthogonal to the height direction, and a first end surface and a second end surface facing each other in a length direction orthogonal to the height direction and the width direction, a first external electrode on a side of the first end surface, and a second external electrode on a side of the second end surface, in which the first external electrode and the second external electrode each include a lower electrode layer and an upper electrode layer on the lower electrode layer, the lower electrode layers include a metal component and a glass component, the upper electrode layers include a metal component and a glass component, and include a plurality of pores inside, an amount of the glass component included in the upper electrode layers is less than an amount of the glass component included in the lower electrode layers, and a maximum inscribed circle diameter of the pores in the upper electrode layers is greater than or equal to 0.02 μm and less than or equal to 0.52 μm.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

Multilayer ceramic capacitors according to preferred embodiments of the present invention will be described.

Figure 1:
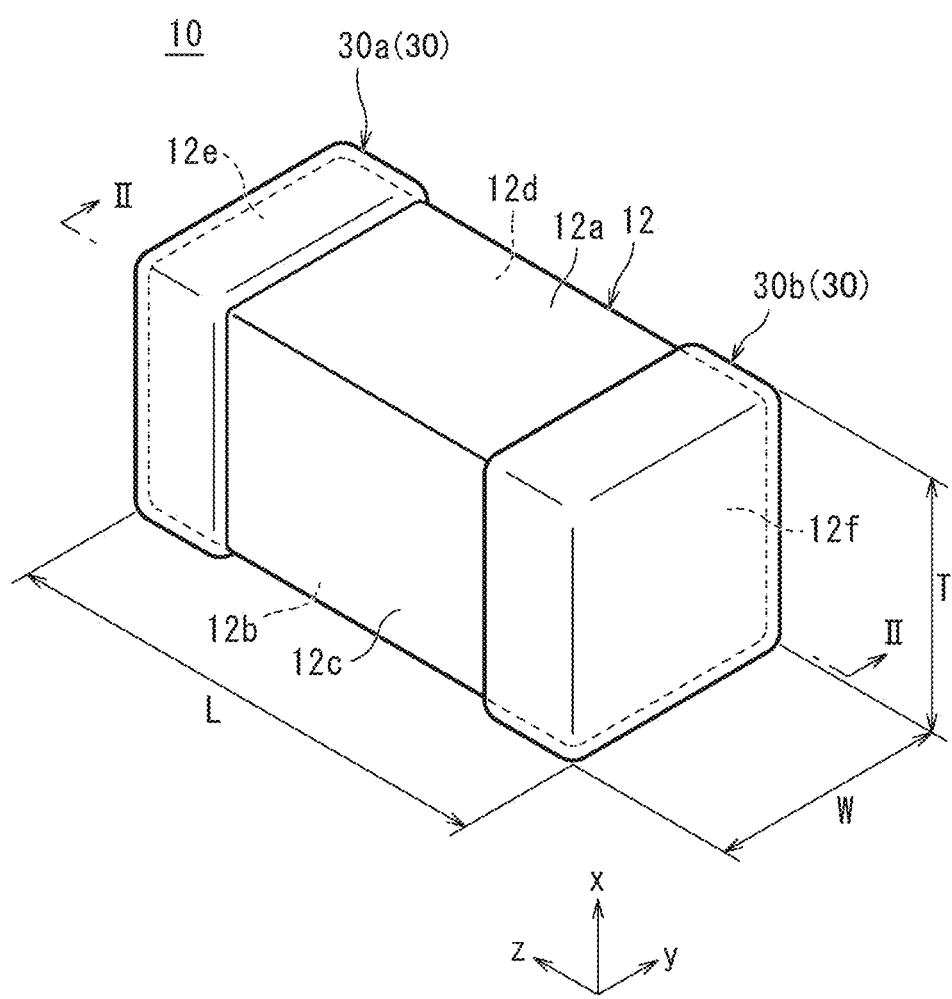
FIG. 1 is an external perspective view illustrating an example of a multilayer ceramic capacitor according to a preferred embodiment of the present invention.
Figure 2:
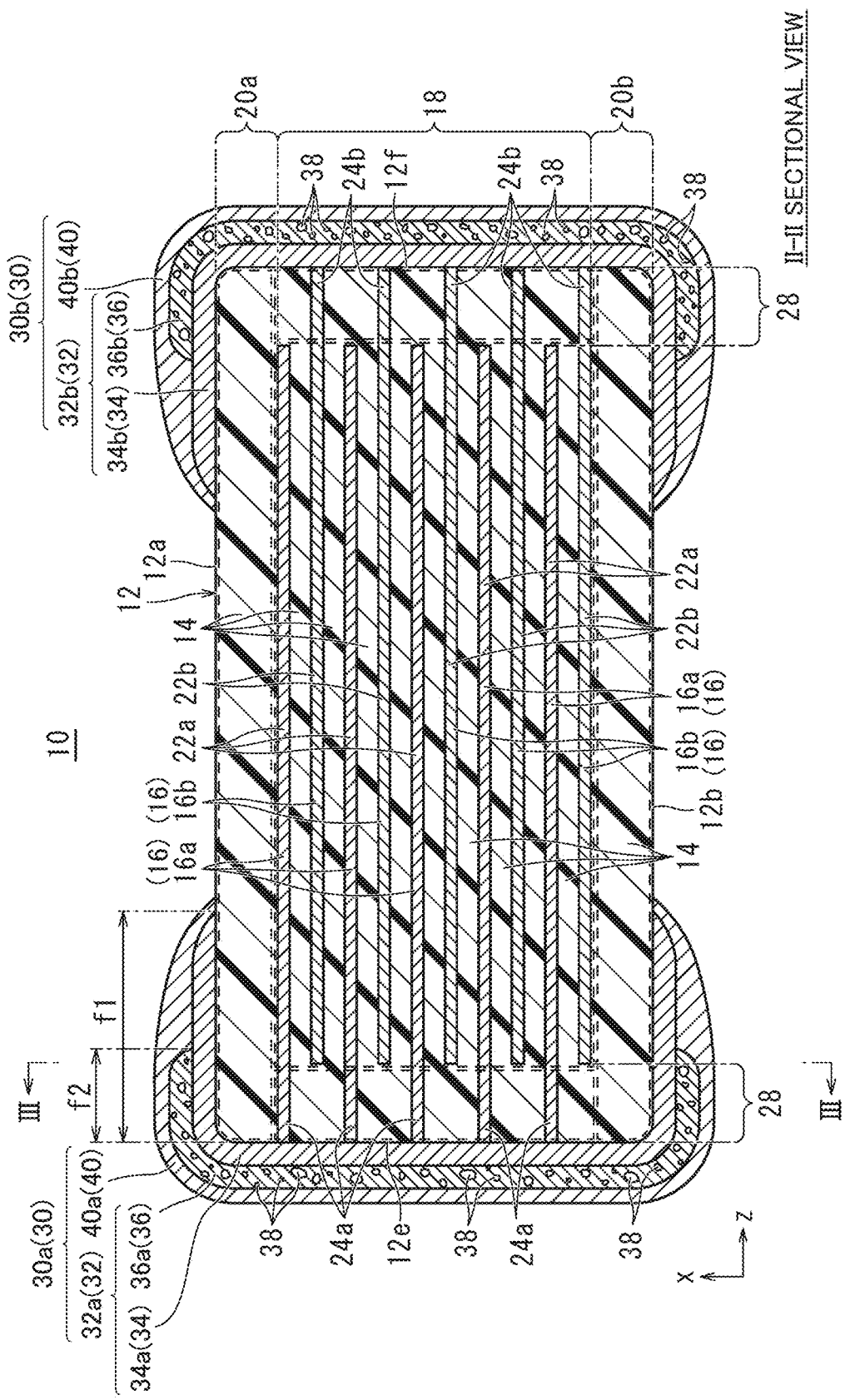
FIG. 2 is a sectional view taken along line II-II in FIG. 1.
Figure 3:
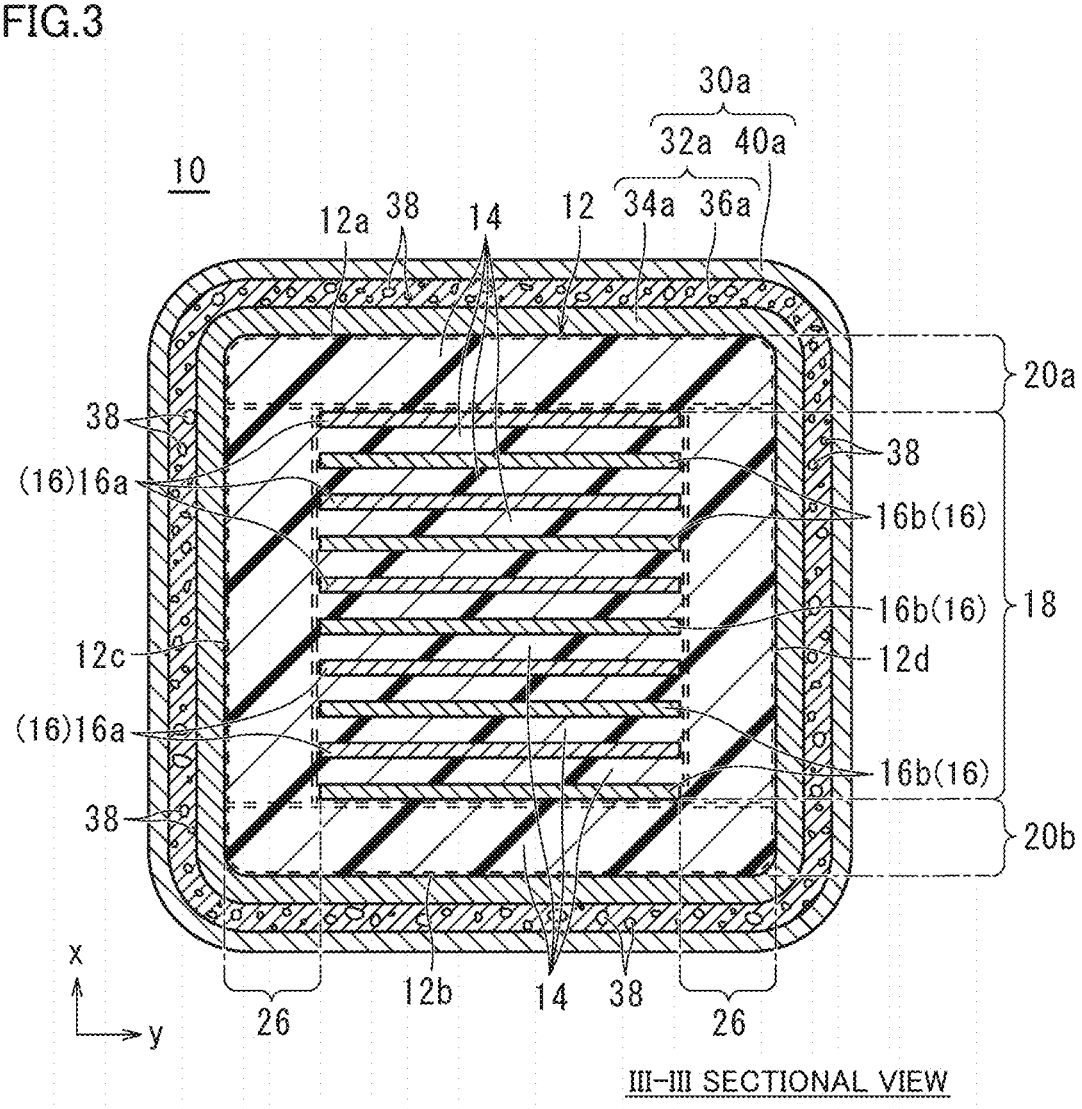
FIG. 3 is a sectional view taken along line III-III in FIG. 2.

FIG. 1 is an external perspective view illustrating an example of a multilayer ceramic capacitor according to a preferred embodiment of the present invention. FIG. 2 is a sectional view taken along line II-II in FIG. 1. FIG. 3 is a sectional view taken along line III-III in FIG. 2.

As illustrated in FIGS. 1 to 3, a multilayer ceramic capacitor 10 includes a multilayer body 12 and external electrodes 30 disposed at both end portions of multilayer body 12.

Multilayer body 12 has a rectangular or substantially rectangular parallelepiped shape.

Multilayer body 12 includes a plurality of dielectric layers 14 laminated, and a plurality of internal electrode layers 16 laminated on dielectric layers 14. Furthermore, multilayer body 12 includes a first main surface 12a and a second main surface 12b facing each other in a height direction x, a first side surface 12c and a second side surface 12d facing each other in a width direction y orthogonal to height direction x, and a first end surface 12e and a second end surface 12f facing each other in length direction z orthogonal to height direction x and width direction y. Multilayer body 12 may include rounded corner portions and rounded ridge portions. The "rectangular parallelepiped shape" includes a rectangular parallelepiped having rounded corner portions and rounded ridge portions. That is, a member having the "rectangular parallelepiped shape" refers to a member in general which includes first and second main surfaces 12a and 12b, first and second side surfaces 12c and 12d, and first and second end surfaces 12e and 12f. Herein, the corner portions each indicate a portion where three adjacent surfaces of the multilayer body meet, and the ridge portions each indicate a portion where two adjacent surfaces of the multilayer body meet. Additionally, some or all of first main surface 12a, second main surface 12b, first side surface 12c, second side surface 12d, first end surface 12e, and second end surface 12f may have irregularities. Dielectric layers 14 and internal electrode layers 16 are alternately laminated in a height direction x.

As illustrated in FIGS. 2 and 3, multilayer body 12 includes an effective layer portion 18 in which the plurality of internal electrode layers 16 face each other in a laminated direction connecting first main surface 12a and second main surface 12b, a first outer layer portion 20a including the plurality of dielectric layers 14 located between first main surface 12a and internal electrode layer 16 located closest to first main surface 12a, and a second outer layer portion 20b including the plurality of dielectric layers 14 located between second main surface 12b and internal electrode layer 16 located closest to second main surface 12b.

First outer layer portion 20a is located on a first main surface 12a side of multilayer body 12 and is an aggregate of the plurality of dielectric layers 14 located between first main surface 12a and internal electrode layer 16 closest to first main surface 12a.

Second outer layer portion 20b is located on a second main surface 12b side of multilayer body 12 and is an aggregate of the plurality of dielectric layers 14 located between second main surface 12b and internal electrode layer 16 closest to second main surface 12b.

A region between first outer layer portion 20a and second outer layer portion 20b is effective layer portion 18. The number of dielectric layers 14 to be laminated is not particularly limited. Additionally, each of dielectric layers 14 preferably has a thickness of greater than or equal to about 0.5 μm and less than or equal to about 10.0 μm, for example.

The dimensions of multilayer body 12 are not particularly limited, but are preferably dimensions that do not exceed the dimensions of multilayer ceramic capacitor 10, including the thickness of external electrodes 30.

Dielectric layer 14 can be formed of, for example, a dielectric material as a ceramic material. As such a dielectric material, for example, a dielectric ceramic including a main component such as $BaTiO_3$, $CaTiO_3$, $SrTiO_3$, or $CaZrO_3$ can be used. When dielectric layer 14 includes the dielectric material as a main component, according to desired characteristics of multilayer body 12, for example, dielectric layer 14 may be added with an accessory component, a content of which is less than that of the main component, such as a manganese (Mn) compound, an iron (Fe) compound, a chromium (Cr) compound, a cobalt (Co) compound, or a nickel (Ni) compound.

Multilayer body 12 includes, as the plurality of internal electrode layers 16, a plurality of first internal electrode layers 16a and a plurality of second internal electrode layers 16b. For example, each of first and second internal electrode layers 16a and 16b has a rectangular or substantially rectangular shape. The plurality of first internal electrode layers 16a and the plurality of second internal electrode layers 16b are embedded to be alternately disposed at equal or substantially equal intervals with dielectric layers 14 interposed therebetween in a height direction x of multilayer body 12. Each of first internal electrode layers 16a and second internal electrode layers 16b is parallel or substantially parallel to first main surface 12a and second main surface 12b. First internal electrode layer 16a and second internal electrode layer 16b face each other with dielectric layer 14 interposed therebetween in a height direction x.

First internal electrode layers 16a are disposed on the plurality of dielectric layers 14 and located inside multilayer body 12. First internal electrode layers 16a include first counter electrode portions 22a facing second internal electrode layers 16b, and first extended electrode portions 24a located on one end sides of first internal electrode layers 16a and extended from first counter electrode portions 22a to first end surface 12e of multilayer body 12. End portions of first extended electrode portions 24a are extended to a surface of first end surface 12e and exposed from multilayer body 12. Thus, first internal electrode layers 16a are not exposed on first main surface 12a, second main surface 12b, first side surface 12c, second side surface 12d, and second end surface 12f.

Second internal electrode layers 16b are disposed on the plurality of dielectric layers 14 and located inside multilayer body 12. Second internal electrode layers 16b include second counter electrode portions 22b facing first internal electrode layers 16a, and second extended electrode portions 24b located on one end sides of second internal electrode layers 16b and extended from second counter electrode portions 22b to second end surface 12f of multilayer body 12. End portions of second extended electrode portions 24b are extended to a surface of second end surface 12f and exposed from multilayer body 12. Thus, second internal electrode layers 16b are not exposed on first main surface 12a, second main surface 12b, first side surface 12c, second side surface 12d, and first end surface 12e.

Furthermore, as illustrated in FIG. 2, multilayer body 12 includes end portions (hereinafter, referred to as "L gaps") 28. Respective L gaps 28 of multilayer body 12 are between second end surface 12f and end portions of first internal electrode layers 16a opposite to first extended electrode portions 24a, and between first end surface 12e and end portions of second internal electrode layers 16b opposite to second extended electrode portions 24b.

As illustrated in FIG. 3, multilayer body 12 includes side portions (hereinafter, referred to as "W gaps") 26. Respective W gaps 26 of multilayer body 12 are provided between first side surface 12c and one ends of first counter electrode portions 22a and second counter electrode portions 22b in width direction y, and between second side surface 12d and the other ends of first counter electrode portions 22a and second counter electrode portions 22b in width direction y.

First internal electrode layers 16a and second internal electrode layers 16b can be made of an appropriate conductive material, for example, a metal such as Ni, Cu, Ag, Pd, or Au, or an alloy including at least one of these metals, such as an Ag—Pd alloy.

Each of internal electrode layers 16, that is, first internal electrode layers 16a and second internal electrode layers 16b preferably has a thickness of greater than or equal to about 0.2 μm and less than or equal to about 2.0 μm, for example.

As illustrated in FIGS. 1 to 3, respective external electrodes 30 are disposed on a first end surface 12e side and a second end surface 12f side of multilayer body 12.

External electrodes 30 include a first external electrode 30a and a second external electrode 30b.

First external electrode 30a is connected to first internal electrode layers 16a and is disposed on at least the surface of first end surface 12e. Additionally, first external electrode 30a extends from first end surface 12e of multilayer body 12 and is also disposed on a portion of first main surface 12a, a portion of second main surface 12b, a portion of first side surface 12c, and a portion of second side surface 12d. In this case, first external electrode 30a is electrically connected to first extended electrode portions 24a of first internal electrode layers 16a.

Second external electrode 30b is connected to second internal electrode layers 16b and is disposed on at least the surface of second end surface 12f. Additionally, second external electrode 30b extends from second end surface 12f and is also disposed on a portion of first main surface 12a, a portion of second main surface 12b, a portion of first side surface 12c, and a portion of second side surface 12d. In this case, second external electrode 30b is electrically connected to second extended electrode portions 24b of second internal electrode layers 16b.

In multilayer body 12, first counter electrode portions 22a of first internal electrode layers 16a and second counter electrode portions 22b of second internal electrode layer 16b face each other with dielectric layers 14 interposed therebetween, thus generating capacitance. Thus, capacitance can be generated between first external electrode 30a to which first internal electrode layers 16a are connected and second external electrode 30b to which second internal electrode layers 16b are connected, and characteristics of the capacitor are exhibited.

Figure 5A:
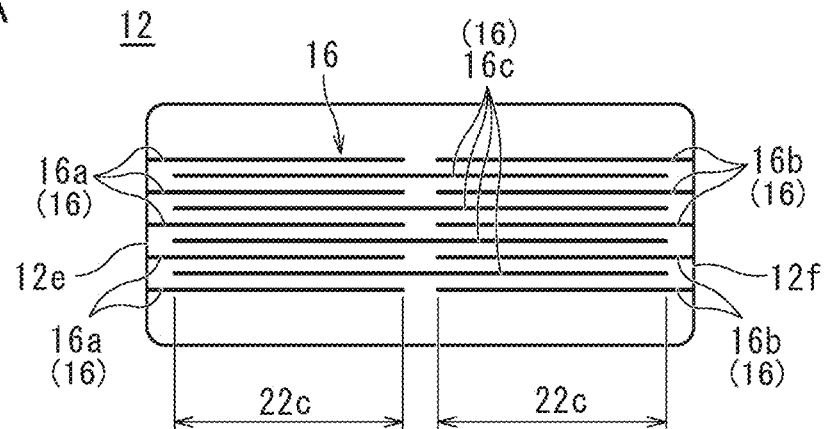
FIG. 5A is a sectional view taken along line II-II in FIG. 1 illustrating a structure in which counter electrode portions of internal electrode layers of a multilayer ceramic capacitor according to a preferred embodiment of the present invention are divided into two sections.
Figure 5B:
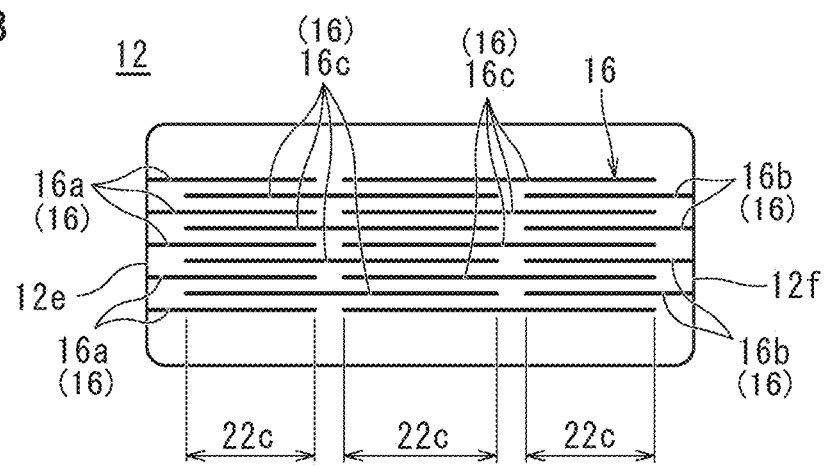
FIG. 5B is a sectional view taken along line II-II in FIG. 1 illustrating a structure in which counter electrode portions of internal electrode layers of a multilayer ceramic capacitor according to a preferred embodiment of the present invention are divided into three sections.
Figure 5C:
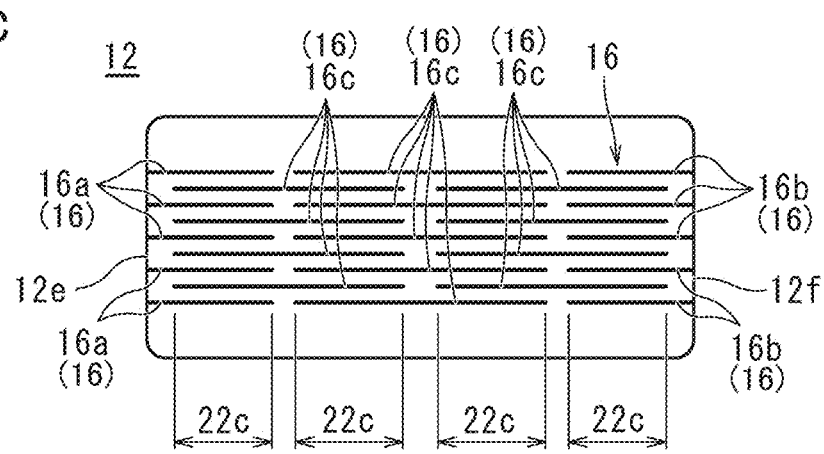
FIG. 5C is a sectional view taken along line II-II in FIG. 1 illustrating a structure in which counter electrode portions of internal electrode layers of a multilayer ceramic capacitor according to a preferred embodiment of the present invention are divided into four sections.

Additionally, as illustrated in FIGS. 5A to 5C, multilayer body 12 illustrated in FIG. 1 may include, in addition to first internal electrode layers 16a and second internal electrode layers 16b, floating internal electrode layers 16c extended to neither first end surface 12e nor second end surface 12f, and may have a structure in which counter electrode portions 22c are divided into a plurality of sections by floating internal electrode layers 16c. For example, multilayer body 12 may have a double structure as illustrated in FIG. 5A, a triple structure as illustrated in FIG. 5B, and a quadruple structure as illustrated in FIG. 5C. Also, multilayer body 12 may have a quadruple or more structure. As described above, in multilayer body 12 having the structure in which counter electrode portions 22c are divided into the plurality of sections, a plurality of capacitor components are provided among internal electrode layers 16a, 16b, and 16c which face each other, and these capacitor components are connected in series. Thus, a voltage applied to each capacitor component decreases, and a withstand voltage of multilayer ceramic capacitor 10 can be increased.

External electrodes 30 include baked electrode layers 32 each including a metal component and a glass component. External electrodes 30 preferably include plating layers 40 disposed on baked electrode layers 32.

First external electrode 30a includes a first baked electrode layer 32a including a metal component and a glass component. First external electrode 30a preferably includes a first plating layer 40a disposed on first baked electrode layer 32a.

Second external electrode 30b includes a second baked electrode layer 32b including a metal component and a glass component. Second external electrode 30b preferably includes a second plating layer 40b disposed on second baked electrode layer 32b.

Baked electrode layers 32 include lower electrode layers 34 disposed on multilayer body 12 and upper electrode layers 36 disposed on lower electrode layers 34. That is, lower electrode layers 34 and upper electrode layers 36 are baked electrodes.

First baked electrode layer 32a includes a first lower electrode layer 34a and a first upper electrode layer 36a disposed on first lower electrode layer 34a.

Second baked electrode layer 32b includes a second lower electrode layer 34b and a second upper electrode layer 36b disposed on second lower electrode layer 34b.

Lower electrode layers 34 include a metal component and a glass component.

Upper electrode layers 36 include a metal component and a glass component. Additionally, upper electrode layers 36 include a plurality of pores 38 inside.

The metal component included in each of lower electrode layers 34 and upper electrode layers 36 includes at least one selected from Cu, Ni, Ag, Pd, an Ag—Pd alloy, Au, and the like. The glass component included in each of lower electrode layers 34 and upper electrode layers 36 includes B, Si, Ba, Sr, Ca, Mg, Al, Ti, Zr, K, Na, and Li.

The plurality of pores 38 inside upper electrode layers 36 are fine spaces, and are irregularly positioned inside upper electrode layers 36.

A content of the glass component included in upper electrode layers 36 is less than a content of the glass component included in lower electrode layers 34. The maximum inscribed circle diameter of the pores included in upper electrode layers 36 is greater than or equal to about 0.02 μm and less than or equal to about 0.52 μm, for example.

If the maximum inscribed circle diameter of pores 38 inside upper electrode layers 36 is greater than about 0.52 μm, the plating solution is likely to flow into pores 38 accordingly and it becomes difficult to efficiently prevent entry of the plating solution. If the maximum inscribed circle diameter of pores 38 is less than about 0.02 μm, residual stresses of external electrodes 30 increase, and at the time of deflection after board mounting, tensile stresses concentrate on multilayer body 12 and the board bending resistance decreases.

Note that, the maximum inscribed circle diameter of the pores included in upper electrode layers 36 is preferably greater than or equal to about 0.02 μm and less than or equal to about 0.10 μm, for example. Such a configuration can reduce the residual stresses of the external electrodes while preventing the entry of the plating solution into multilayer ceramic capacitor 10, thus more efficiently achieving both the moisture resistance and the board bending resistance.

Method for Measuring Amount of Glass Component

Regarding a method for measuring the amount of the glass component included in each of lower electrode layers 34 and upper electrode layers 36, the following method can be used for the measurement.

That is, first, multilayer ceramic capacitor 10 is subjected to a process such as embedding in an epoxy resin, and is polished until a cross section at a position of ½ in the width direction is exposed. Next, external electrode portions immediately above central portions in a height direction x on the first end surface 12e side and the second end surface 12f side, or central portions in length direction z on the first main surface 12a side and the second main surface 12b side are observed with an electron microscope to obtain a composition image from reflected electrons (reflected electron composition image). The obtained reflected electron composition image is ternarized using image analysis software such that the obtained reflected electron composition image can be divided into three components of a metal portion (bright portion), a glass portion (intermediate portion), and a pore portion (dark portion) of each of external electrodes 30. A ratio of an area of the glass portion (intermediate portion) to a total area of the metal portion (bright portion) and the glass portion (intermediate portion) can be calculated, and measured as the amount of the glass component.

Herein, regarding an observation range, for example, lower electrode layer 34 is measured in a range of length direction z: 10 μm×height direction x: 50 μm inside lower electrode layer 34, and upper electrode layer 36 is measured in a range of length direction z: 3 μm×height direction x: 10 μm inside upper electrode layer 36.

Method for Measuring Maximum Inscribed Circle Diameter of Pores

Regarding a method for measuring the maximum inscribed circle diameter of pores 38 included in upper electrode layers 36, the following method can be used for the measurement.

That is, multilayer ceramic capacitor 10 is subjected to a process such as embedding in an epoxy resin, and is polished until a cross section at a position of ½ in the width direction is exposed. Next, external electrode portions immediately above central portions in a height direction x on the first end surface 12e side and the second end surface 12f side, or central portions in length direction z on the first main surface 12a side and the second main surface 12b side are observed with an electron microscope to obtain a composition image from reflected electrons (reflected electron composition image). The obtained reflected electron composition image is binarized using image analysis software such that the obtained reflected electron composition image can be divided into a metal portion and two components of a glass portion (bright portion) and a pore portion (dark portion) of each of the external electrodes. The pore portion (dark portion) is contracted. Since the number of pixels until the contraction is completed corresponds to a maximum inscribed circle radius, the number of pixels is converted into a length and doubled to obtain the maximum inscribed circle diameter.

Preferably, lower electrode layers 34 have, at the respective central portions in a height direction x on the first end surface 12e side and the second end surface 12f side, a thickness of greater than or equal to about 1 μm and less than or equal to about 200 μm in length direction z, and at the respective central portions in length direction z on the first main surface 12a side and the second main surface 12b side, a thickness of greater than or equal to about 1 μm and less than or equal to about 100 μm in a height direction x, for example.

Preferably, upper electrode layers 36 have, at the respective central portions in a height direction x on the first end surface 12e side and the second end surface 12f side, a thickness of greater than or equal to about 1 μm and less than or equal to about 200 μm in length direction z, and at the respective central portions in length direction z on the first main surface 12a side and the second main surface 12b side, a thickness of greater than or equal to about 1 μm and less than or equal to about 100 μm in a height direction x.

Note that, the thickness of each of upper electrode layers 36 is preferably greater than the thickness of each of lower electrode layers 34. As described above, when the thickness of upper electrode layer 36 is greater than that of lower electrode layer 34, stress relaxation by upper electrode layer 36 is effectively exhibited.

Additionally, a ratio (glass component ratio) of a content of the glass component included in upper electrode layers 36 to a content of the glass component included in lower electrode layers 34 is more preferably greater than or equal to about 0.05 and less than or equal to about 0.28, for example.

If the ratio of the content of the glass component included in upper electrode layers 36 to the content of the glass component included in lower electrode layers 34 is less than about 0.05, an anchor effect caused by the glass existing between lower electrode layers 34 and upper electrode layers 36 fails to work, and an adhesion strength is hardly maintained. On the other hand, if the ratio is greater than about 0.28, the glass component seeps out to the surfaces of the external electrodes, and thus, plating is not applied, and mounting failures such as decrease in solder wettability and solder burst are likely to occur.

An area occupation ratio of the pores in cross sections of upper electrode layers 36 is preferably greater than or equal to about 2% and less than or equal to about 10%, for example.

If the area occupation ratio of the pores in the cross sections of upper electrode layers 36 is less than about 2%, the residual stresses of the external electrodes cannot be reduced, and the board bending resistance is likely to decrease. On the other hand, if the area occupation ratio is greater than about 10%, the plating solution enters pores 38, and thus, the entry of the plating solution cannot be efficiently prevented, and the moisture resistance is likely to decrease.

Method for Measuring Area Occupation Ratio of Pores in Upper Electrode Layers

Regarding a method for measuring the area occupation ratio of the pores included in upper electrode layers 36, the following method can be used for the measurement.

That is, multilayer ceramic capacitor 10 is subjected to a process such as embedding in an epoxy resin, and is polished until a cross section at a position of ½ in the width direction is exposed. Next, external electrode portions immediately above central portions in a height direction x on the first end surface 12e side and the second end surface 12f side, or central portions in length direction z on the first main surface 12a side and the second main surface 12b side are observed with an electron microscope to obtain a composition image from reflected electrons (reflected electron composition image). The obtained reflected electron composition image is binarized using image analysis software such that the obtained reflected electron composition image can be divided into a metal portion and two components of a glass portion (bright portion) and a pore portion (dark portion) of each of the external electrodes. A ratio of an area of the pore portion (dark portion) to an area of the metal portion and the glass portion (bright portion) of the external electrode is calculated using image analysis software to measure the area occupation ratio of the pores.

Furthermore, the pores included in upper electrode layers 36 preferably have a circular cross-sectional shape or an elliptical cross-sectional shape. As described above, when the pores have the circular cross-sectional shape or the elliptical cross-sectional shape, there is a high possibility that the pores are closed pores, and there is an effect that the plating solution is less likely to penetrate into the electrode.

In interfaces between lower electrode layers 34 and upper electrode layers 36, pores 38 inside upper electrode layers 36 preferably include the glass component. With such a configuration, even in pores 38 that are continuous three-dimensionally in a case of metal alone, the glass is accumulated in a recessed portion since pores 38 include the glass component, and thus, the pores are likely to be closed pores, and there is an effect that the plating solution is less likely to penetrate into the electrode.

Furthermore, lower electrode layers 34 may include pores 38 inside. When lower electrode layers 34 include pores 38 inside, an area occupation ratio of the pores in cross sections of lower electrode layers 34 is preferably less than or equal to about 2%. With such a configuration, even when the area occupation ratio of the pores in upper electrode layers 36 is large, since the area occupation ratio of the pores in lower electrode layers 34 is small, transmission of water vapor can be prevented, and deterioration of moisture resistance can be made less likely to occur.

Method For Measuring Area Occupation Ratio of Pores in Lower Electrode Layers

Regarding a method for measuring the area occupation ratio of the pores included in lower electrode layers 34, the following method can be used for the measurement.

That is, multilayer ceramic capacitor 10 is subjected to a process such as embedding in an epoxy resin, and is polished until a cross section at a position of ½ in the width direction is exposed. Next, external electrode portions immediately above central portions in a height direction x on the first end surface 12e side and the second end surface 12f side, or central portions in length direction z on the first main surface 12a side and the second main surface 12b side are observed with an electron microscope to obtain a composition image from reflected electrons (reflected electron composition image). The obtained reflected electron composition image is binarized using image analysis software such that the obtained reflected electron composition image can be divided into a metal portion and two components of a glass portion (bright portion) and a pore portion (dark portion) of each of the external electrodes. A ratio of an area of the pore portion (dark portion) to an area of the metal portion and the glass portion (bright portion) of the external electrode is calculated using image analysis software to measure the area occupation ratio of the pores.

First lower electrode layer 34a is disposed on first end surface 12e and is disposed to extend to at least portions of first main surface 12a and second main surface 12b.

Second lower electrode layer 34b is disposed on second end surface 12f and is disposed to extend to at least portions of first main surface 12a and second main surface 12b.

First upper electrode layer 36a is disposed on first lower electrode layer 34a disposed on first end surface 12e, and is disposed to extend so as to cover at least a portion of first lower electrode layer 34a disposed on first main surface 12a and second main surface 12b.

Second upper electrode layer 36b is disposed on second lower electrode layer 34b disposed on second end surface 12f, and is disposed to extend so as to cover at least a portion of second lower electrode layer 34b disposed on first main surface 12a and second main surface 12b.

Here, f1 represents a dimension, from first end surface 12e to a termination in length direction z toward an inward side of multilayer body 12, of first lower electrode layer 34a disposed to extend to at least portions of first main surface 12a and second main surface 12b, or a dimension, from second end surface 12f to a termination in length direction z toward the inward side of multilayer body 12, of second lower electrode layer 34b disposed to extend to at least portions of first main surface 12a and second main surface 12b.

Additionally, f2 represents a dimension, from first end surface 12e to a termination in length direction z toward the inward side of multilayer body 12, of first upper electrode layer 36a disposed to extend so as to cover at least a portion of first lower electrode layer 34a disposed on first main surface 12a and second main surface 12b, or a dimension, from second end surface 12f to a termination in length direction z toward the inward side of multilayer body 12, of second upper electrode layer 36b disposed to extend so as to cover at least a portion of second lower electrode layer 34b disposed on first main surface 12a and second main surface 12b.

In this case, as illustrated in FIG. 2, the following relationship is preferably satisfied: f1>f2.

Such a configuration eliminates recoating on the main surface side, and can reduce the dimensions of external electrodes 30 in a height direction x and width direction y, thus increasing the design dimension of multilayer body 12. As a result, multilayer ceramic capacitor 10 can have a smaller size and a larger capacitance.

Figure 4:
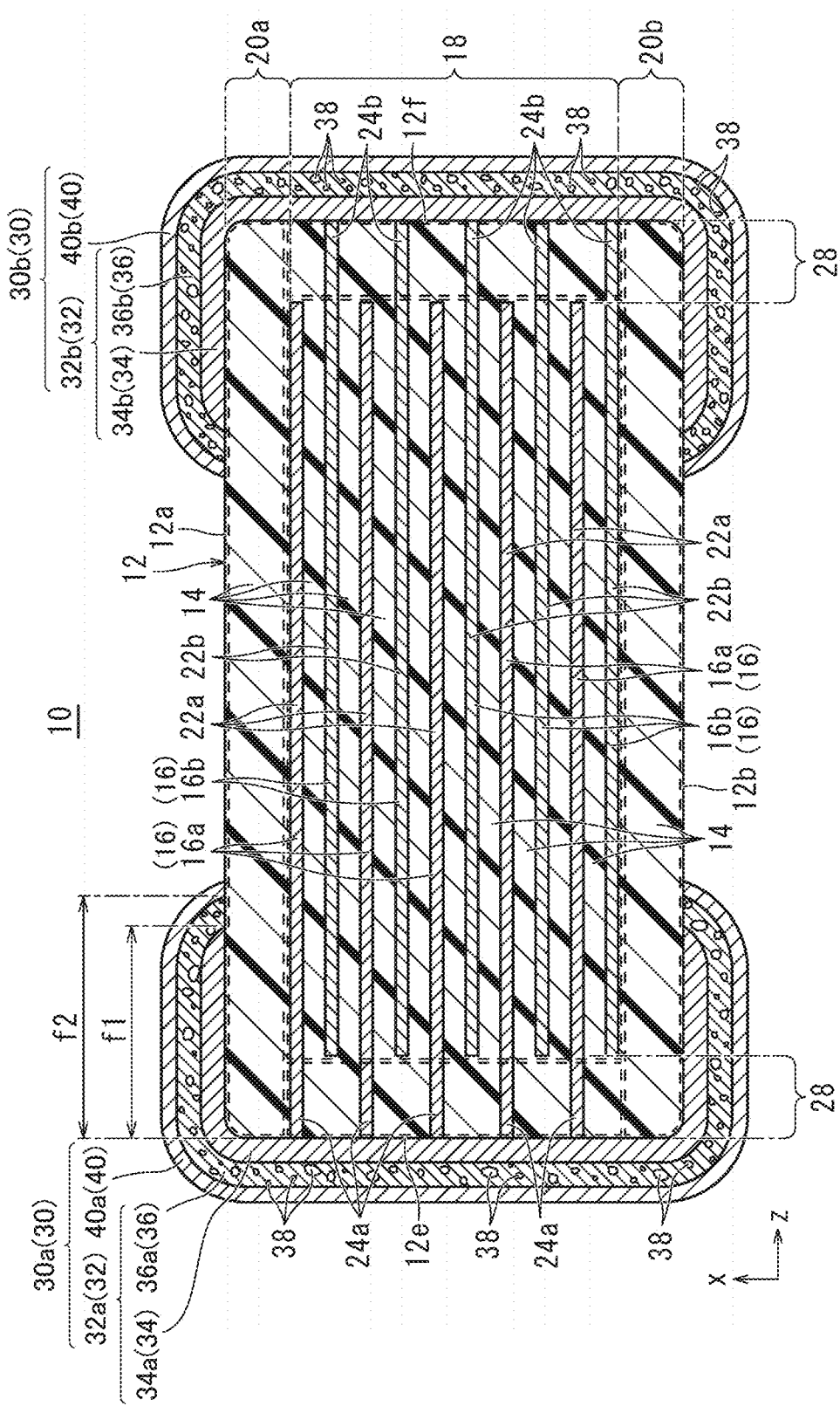
FIG. 4 is a sectional view of a multilayer ceramic capacitor according to a modification of a preferred embodiment of the present invention, which corresponds to FIG. 2.

Here, another preferred embodiment of lower electrode layers 34 and upper electrode layers 36 will be described. FIG. 4 is a sectional view of a multilayer ceramic capacitor according to a modification of a preferred embodiment of the present invention, which corresponds to FIG. 2.

First lower electrode layer 34a is disposed on first end surface 12e and is disposed to extend to at least portions of first main surface 12a and second main surface 12b.

Second lower electrode layer 34b is disposed on second end surface 12f and is disposed to extend to at least portions of first main surface 12a and second main surface 12b.

First upper electrode layer 36a is disposed on first lower electrode layer 34a disposed on first end surface 12e, and is disposed to extend so as to cover first lower electrode layer 34a disposed on first main surface 12a and second main surface 12b.

Second upper electrode layer 36b is disposed on second lower electrode layer 34b disposed on second end surface 12f, and is disposed to extend so as to cover second lower electrode layer 34b disposed on first main surface 12a and second main surface 12b.

Here, f1 represents a dimension, from first end surface 12e to a termination in length direction z toward the inward side of multilayer body 12, of first lower electrode layer 34a disposed to extend to at least portions of first main surface 12a and second main surface 12b, or a dimension, from second end surface 12f to a termination in length direction z toward the inward side of multilayer body 12, of second lower electrode layer 34b disposed to extend to at least portions of first main surface 12a and second main surface 12b.

Additionally, f2 represents a dimension, from first end surface 12e to a termination in length direction z toward the inward side of multilayer body 12, of first upper electrode layer 36a disposed to cover first lower electrode layer 34a disposed on first main surface 12a and second main surface 12b, or a dimension, from second end surface 12f to a termination in length direction z toward the inward side of multilayer body 12, of second upper electrode layer 36b disposed to cover second lower electrode layer 34b disposed on first main surface 12a and second main surface 12b.

In this case, as illustrated in FIG. 4, the following relationship is preferably satisfied: f1<f2.

Such a configuration can reduce plating defects due to glass floating of lower electrode layers 34 and at the same time achieve stress relaxation because lower electrode layers 34 are completely covered with upper electrode layers 36. As a result, the reliability of multilayer ceramic capacitor 10 can be improved.

Additionally, external electrodes 30 preferably further include plating layers 40 disposed on upper electrode layers 36. With such a configuration, it is possible to provide solder wettability and obtain solder leach resistance when solder mounting is performed to ensure conduction and fixing to the circuit board.

With reference to FIGS. 2 and 3, a description will be given of first plating layer 40a and second plating layer 40b, which are plating layers 40 disposed on upper electrode layers 36 of baked electrode layers 32.

First plating layer 40a and second plating layer 40b include, for example, at least one selected from Cu, Ni, Sn, Ag, Pd, an Ag—Pd alloy, Au, and the like.

First plating layer 40a is disposed to completely cover first baked electrode layer 32a.

Second plating layer 40b is disposed to completely cover second baked electrode layer 32b.

Each of first plating layer 40a and second plating layer 40b may include a plurality of layers. In this case, each of plating layers 40 preferably has a two-layer structure of a lower plating layer (Ni plating layer) formed by Ni plating on baked electrode layer 32 and an upper plating layer (Sn plating layer) formed by Sn plating on the lower plating layer.

That is, first plating layer 40a includes a first lower plating layer and a first upper plating layer located on a surface of the first lower plating layer.

Additionally, second plating layer 40b includes a second lower plating layer and a second upper plating layer located on a surface of the second lower plating layer.

Lower plating layers formed by Ni plating are used to prevent baked electrode layers 32 from being eroded by solder at the time of mounting multilayer ceramic capacitor 10. Upper plating layers formed by Sn plating are used to improve solder wettability at the time of mounting multilayer ceramic capacitor 10 and facilitate the mounting.

Each of the Ni plating layers preferably has a thickness of greater than or equal to about 1.0 μm and less than or equal to about 15.0 μm, for example.

Each of the Sn plating layers preferably has a thickness of greater than or equal to about 1.0 μm and less than or equal to about 15.0 μm, for example.

A dimension L represents a dimension in length direction z of multilayer ceramic capacitor 10 including multilayer body 12, first external electrode 30a, and second external electrode 30b. A dimension T represents a dimension in a height direction x of multilayer ceramic capacitor 10 including multilayer body 12, first external electrode 30a, and second external electrode 30b. A dimension W represents a dimension in width direction y of multilayer ceramic capacitor 10 including multilayer body 12, first external electrode 30a, and second external electrode 30b.

Multilayer ceramic capacitor 10 has a dimension L in length direction z of greater than or equal to about 0.20 mm and less than or equal to about 5.70 mm, a dimension W in width direction y of greater than or equal to about 0.10 mm and less than or equal to about 5.00 mm, and a dimension T in a height direction x of greater than or equal to about 0.05 mm and less than or equal to about 2.50 mm, for example. Additionally, the dimensions of multilayer ceramic capacitor 10 can be measured with a microscope.

In multilayer ceramic capacitor 10 illustrated in FIG. 1, since lower electrode layers 34 and upper electrode layers 36 have the above-described configurations, both the moisture resistance and the board bending resistance of multilayer ceramic capacitor 10 can be improved.

More specifically, since the content of the glass component in lower electrode layers 34 connected to multilayer body 12 is greater than the content of the glass component in upper electrode layers 36 disposed on lower electrode layers 34, structurally, lower electrode layers 34 have high adhesion to multilayer body 12, and upper electrode layers 36 have a low adhesive property to multilayer body 12. As a result, tensile stresses generated at the time of board bending can be reduced between both end surfaces 12e and 12f of multilayer body 12 and upper electrode layers 36, and thus the board bending resistance can be improved accordingly.

Additionally, since upper electrode layers 36 have the plurality of pores 38 inside, and the area occupation ratio of or the shape or size of the pores in upper electrode layers 36 in direct contact with plating layers 40 is controlled, the plating solution is less likely to penetrate into the external electrodes, and the moisture resistance can be enhanced.

Furthermore, since the area occupation ratio of or the shape or size of the pores in upper electrode layers 36 is controlled, the residual stresses of external electrodes 30 are reduced, the concentration of the tensile stresses on multilayer body 12 at the time of deflection after board mounting is reduced, and the board bending resistance can be enhanced.

2. Method for Manufacturing Multilayer Ceramic Capacitor

Next, a non-limiting example of a method for manufacturing a multilayer ceramic capacitor according to a preferred embodiment of the present invention will be described.

First, dielectric sheets for dielectric layers and a conductive paste for internal electrode layers are prepared. The dielectric sheets and the conductive paste for internal electrode layers include a binder and a solvent. A known binder and a known solvent can be used.

Then, the conductive paste for internal electrode layers is printed on the dielectric sheets in predetermined patterns by, for example, screen printing, gravure printing, or the like. Thus, dielectric sheets on each of which patterns of the first internal electrode layers are printed, and dielectric sheets on each of which patterns of the second internal electrode layers are printed are prepared.

Additionally, regarding the dielectric sheets, dielectric sheets for outer layers, on each of which patterns of internal electrode layers are not printed, are also prepared.

Subsequently, a predetermined number of dielectric sheets for outer layers, on each of which the patterns of the internal electrode layers are not printed, are laminated to form a portion to be the second outer layer portion on the second main surface side. Then, on the portion to be the second outer layer portion, the dielectric sheets on each of which the patterns of the first internal electrode layers are printed and the dielectric sheets on each of which the patterns of the second internal electrode layers are printed are sequentially laminated to have a structure according to a preferred embodiment of the present invention, thus forming a portion to be the effective layer portion. A predetermined number of dielectric sheets for outer layers on each of which the patterns of the internal electrode layers are not printed are laminated on the portion to be the effective layer portion, thus forming a portion to be the first outer layer portion on the first main surface side. Thus, a multilayer sheet is prepared.

Next, the multilayer sheet is pressed in the laminated direction by, for example, isostatic pressing to prepare a multilayer block.

Then, the multilayer block is cut into a predetermined size to cut out a multilayer chip. At this time, corner portions and ridge portions of the multilayer chip may be rounded by barrel polishing or the like.

Next, the multilayer chip is fired to prepare a multilayer body. A firing temperature is preferably greater than or equal to about 900° C. and less than or equal to about 1400° C., although the firing temperature may vary depending on materials of the dielectric layers and the internal electrode layers.

Subsequently, a conductive paste for lower electrode layers including a metal component and a glass component, and a conductive paste for upper electrode layers including a metal component and a glass component are prepared. Note that, the same conductive paste may be prepared for the conductive paste for lower electrode layers and the conductive paste for upper electrode layers.

The conductive paste for lower electrode layers includes a metal powder, a glass powder, a resin component, a solvent component, and an additive component such as a dispersant or a rheology control agent. The metal powder preferably has a particle size D50 of greater than or equal to about 0.2 μm and less than or equal to about 20 μm, for example. The glass powder preferably has a particle size D50 of greater than or equal to about 0.2 μm and less than or equal to about 5 μm, for example. The resin component is an acrylic resin. The solvent component is terpineol and an alcohol-based solvent.

The conductive paste for upper electrode layers includes a metal powder, a glass powder, a resin component, a solvent component, and an additive component such as a dispersant or a rheology control agent. The metal powder preferably has a particle size D50 of greater than or equal to about 0.02 μm and less than or equal to about 2 μm. The glass powder preferably has a particle size D50 of greater than or equal to about 0.02 μm and less than or equal to about 1 μm, for example. The resin component is an acrylic resin. The solvent component is terpineol and an alcohol-based solvent.

The conductive paste for upper electrode layers of low temperature curing type includes a metal powder, a solvent component, and an additive component such as a dispersant or a rheology control agent. The metal powder preferably has a particle size D50 of greater than or equal to about 0.02 μm and less than or equal to about 2 μm. The solvent component is an alcohol-based solvent, for example.

Next, the conductive paste for lower electrode layers to be the lower electrode layers is applied to both end surfaces of the multilayer body to form the lower electrode layers. For example, the conductive paste is applied to both end surfaces of the multilayer body by a method such as dipping or screen printing, and then baked to form the lower electrode layers. The baking at this time is preferably performed at a temperature of greater than or equal to about 700° C. and less than or equal to about 900° C., for example.

Subsequently, the conductive paste for upper electrode layers to be the upper electrode layers is applied on the lower electrode layers to form the upper electrode layers. For example, the conductive paste is applied to both end surfaces of the multilayer body by a method such as dipping or screen printing, and then baked to form the upper electrode layers. The baking at this time is preferably performed at a temperature of greater than or equal to about 200° C. and less than or equal to about 900° C., for example.

Note that, as illustrated in FIG. 2 or FIG. 4, each of the upper electrode layers can be formed by adjusting the application amount of the conductive paste to be the upper electrode layers.

Here, the following example manufacturing method is used to form the pores inside the upper electrode layers.

That is, pores can be intentionally generated inside the upper electrode layers by not including glass in the conductive paste for upper electrode layers or by reducing a glass powder charged amount of the upper electrode layers with respect to a glass powder charged amount of the lower electrode layers. Additionally, pores can be intentionally generated inside the upper electrode layers by lowering the firing temperature.

The following example manufacturing method is used to control the area occupation ratio of the pores included in the upper electrode layers to be greater than or equal to about 2% and less than or equal to about 10%, for example.

That is, the pore size and the area occupation ratio of the pores after sintering can be controlled by controlling the particle size of the metal powder included in the conductive paste for upper electrode layers and the firing temperature. Specifically, as the particle size is smaller, the pore size can be made smaller. Additionally, as the firing temperature is higher, the area occupation ratio of pores can be lowered.

The following example manufacturing method is used to control the maximum inscribed circle diameter of the pores included in the upper electrode layers.

That is, the pore size after sintering can be controlled by controlling the particle size of the metal powder included in the conductive paste for upper electrode layers. Specifically, as the particle size is smaller, the pore size can be made smaller.

Next, the plating layers are formed by plating the surfaces of the baked electrode layers as appropriate. More specifically, two plating layers including a Ni plating layer and a Sn plating layer on the Ni plating layer are formed on each of the upper electrode layers of the baked electrode layers. The Ni plating layer and the Sn plating layer are sequentially formed by, for example, a barrel plating method.

As described above, multilayer ceramic capacitor 10 according to a preferred embodiment of the present invention is manufactured.

3. Experimental Example

A multilayer ceramic capacitor as a sample was prepared in accordance with the foregoing example manufacturing method, and an evaluation of a plating defect, an evaluation of adhesion force, a moisture resistance reliability test, and a board bending resistance test were performed.

(a) Specifications of Sample of Experimental Example

As an experimental example, multilayer ceramic capacitors with the following specifications were prepared to have the structure illustrated in FIGS. 1, 2, and 4.

Dimensions (design values) of multilayer ceramic capacitor: L×W×T=3.2 mm×1.6 mm×1.6 mm
Material of main component of dielectric layer: $BaTiO_3$
Capacitance: 10 nF
Rated voltage: 25 V
Material of internal electrode layer: Ni
Specifications of external electrode layer
Specifications of baked electrode layer
Baked electrode layer: two-layer structure of lower electrode layer and upper electrode layer
Seizures located at first end surface and second end surface in cross section of multilayer body at position of ½ W
Thickness of electrode layer in length direction z at central portion in a height direction x: 90 μm
Specifications of lower electrode layer
Lower electrode layer: baked electrode layer including metal component and glass component
Metal component: Cu
Glass component: barium borosilicate glass (component name: B, Si, Ba, Sr, Ca, Mg, Al, Ti, Zr, K, Na, Li)
Content of glass component: see Table 1
Area occupation ratio of pores: 2%
Specifications of upper electrode layer
Lower electrode layer: baked electrode layer including metal component and glass component
Metal component: Cu
Glass component: barium borosilicate glass (component name: B, Si, Ba, Sr, Ca, Mg, Al, Ti, Zr, K, Na, Li)
Content of glass component: see Table 1
Area occupation ratio and maximum inscribed circle diameter of pores: see Table 1
Specifications of plating layer
Plating layer: two-layer structure of Ni plating layer and Sn plating layer
Thickness of Ni plating layer
Thickness in length direction z at central portion in a height direction x of each of Ni plating layers located at first end surface and second end surface in cross section of multilayer body at position of ½ W: about 4 μm
Thickness of Sn plating layer
Thickness in length direction z at central portion in a height direction x of each of Sn plating layers located at first end surface and second end surface in cross section of multilayer body at position of ½ W: about 4 μm In samples of sample Nos. 1 to 7, the content of the glass component in the lower electrode layers was set to about 22%, and the content of the glass component in the upper electrode layers was changed in a range of about 0.2% to about 15%.

In samples of sample Nos. 8 to 12, the maximum inscribed circle diameter of the pores disposed inside the upper electrode layers was changed in a range of about 0.02 μm to about 0.52 μm.

In samples of sample Nos. 13 to 16, the area occupation ratio of pores disposed inside the upper electrode layers was changed in a range of about 0.8% to about 12.2%.

In samples of sample Nos. 17 to 20, the content of the glass component in the upper electrode layers was in a range greater than or equal to the content of the glass component in the lower electrode layers. Additionally, the maximum inscribed circle diameter of the pores disposed inside the upper electrode layers was changed in a range of about 0.75 μm to about 1.20 μm.

(b) Evaluation of Plating Defect

A multilayer ceramic capacitor as a sample after formation of plating layers was prepared, and polished such that an LT surface of the multilayer ceramic capacitor was exposed to a position of ½ W in width direction y connecting the first side surface and the second side surface of the multilayer ceramic capacitor, thus exposing a cross section. Then, a sample having a discontinuous portion in the plating layers was counted as the plating defect. Fifty multilayer ceramic capacitors were prepared for each sample. Herein, determination criteria were "good" when the number of samples counted as the plating defect was 0, "fair" when the number of samples was greater than or equal to 1 and less than or equal to 5, and "insufficient" when the number of samples was greater than or equal to 6 and less than or equal to 50.

(c) Evaluation of Adhesion Force

A multilayer ceramic capacitor as a sample after formation of plating layers was prepared. The prepared multilayer ceramic capacitor was mounted on a board. Thereafter, a terminal was pressed against the multilayer ceramic capacitor in a horizontal direction of the board, a stress value at which the multilayer ceramic capacitor was detached from the board was measured, and the adhesion force of the multilayer ceramic capacitor to the board was evaluated. Twenty multilayer ceramic capacitors were prepared for each sample. The stress value of each sample was an average value of the twenty multilayer ceramic capacitors. Herein, determination criteria were "good" when the stress value was greater than or equal to 95 N, "fair" when the stress value was greater than or equal to 30 N and less than 95 N, and "insufficient" when the stress value was less than 30 N.

(d) Moisture Resistance Reliability Test

A multilayer ceramic capacitor as a sample after formation of plating layers was prepared. The prepared multilayer ceramic capacitor was subjected to a direct-current voltage load of 25 V (rated voltage) in a water vapor atmosphere of 125° C., 95% PH, and 0.1 MPa. After 144 hours, an amount of change in a logarithmic value Log IR of the insulation resistance of the multilayer ceramic capacitor was measured, and moisture resistance of the multilayer ceramic capacitor was evaluated. Seventy multilayer ceramic capacitors were prepared for each sample. Herein, determination criteria were "good" when the amount of change in the logarithmic value Log IR was less than or equal to 0.5 digits, "fair" when the amount of change was less than 1.0 digit, and "insufficient" when the amount of change was greater than or equal to 1.0 digit.

(e) Board Bending Resistance Test

A multilayer ceramic capacitor as a sample after formation of plating layers was prepared. The prepared multilayer ceramic capacitor was mounted on a board. Thereafter, a deflection tester applied, at a speed of 1 mm/s with a pressing jig, strain to a back surface of a mounting board on which the multilayer ceramic capacitor was not mounted. Then, a deflection amount of the board when the multilayer ceramic capacitor as a sample was cracked was measured, and the board bending resistance was evaluated. Twenty multilayer ceramic capacitors were prepared for each sample. Herein, determination criteria were "excellent" when the deflection amount of the board was greater than or equal to 2.5 mm, "good" when the deflection amount was greater than 2.0 mm and less than 2.5 mm, "fair" when the deflection amount was equal to 2.0 mm, and "insufficient" when the deflection amount was less than 2.0 mm.

(f) Results

Table 1 shows results of the evaluation of the plating defect, the evaluation of the adhesion force, the moisture resistance reliability test, and the board bending resistance test which were performed for the samples of the respective sample numbers. Note that, the sample numbers marked with an asterisk (*) in the table are outside the scope of the present invention.

Herein, in the comprehensive determination based on the above tests shown in Table 1, "good" indicates that all evaluation items of the evaluation of the plating defect, the evaluation of the adhesion force, the moisture resistance reliability test, and the board bending resistance test resulted in a determination of "good", "fair" indicates that the evaluation resulted in a determination of "fair" was included in any of the evaluation items, and "insufficient" indicates that the evaluation resulted in a determination of "insufficient" was included in any of the evaluation items.

TABLE 1

| Sample No. | Content of glass component in lower electrode layers: a (%) | Content of glass component in upper electrode layers: b (%) | Ratio of glass component (b/a) | Maximum inscribed circle diameter of pores disposed inside upper electrode layers (μm) | Area occupation ratio of pores disposed inside upper electrode layers (%) | Number of plating defects (piece) | Determination of plating defect |
|---|---|---|---|---|---|---|---|
| 1 | 22 | 0.2 | 0.01 | 0.24 | 5.0 | 0/50 | good |
| 2 | 22 | 0.6 | 0.03 | 0.24 | 5.0 | 0/50 | good |
| 3 | 22 | 1.0 | 0.05 | 0.24 | 5.0 | 0/50 | good |
| 4 | 22 | 3.0 | 0.14 | 0.24 | 5.0 | 0/50 | good |
| 5 | 22 | 6.2 | 0.28 | 0.12 | 5.0 | 0/50 | good |
| 6 | 22 | 10.0 | 0.45 | 0.06 | 5.0 | 3/50 | fair |
| 7 | 22 | 15.0 | 0.68 | 0.02 | 5.0 | 7/50 | fair |
| 8 | 22 | 3.0 | 0.14 | 0.02 | 5.0 | 0/50 | good |
| 9 | 22 | 3.0 | 0.14 | 0.05 | 5.0 | 0/50 | good |
| 10 | 22 | 3.0 | 0.14 | 0.10 | 5.0 | 0/50 | good |
| 11 | 22 | 3.0 | 0.14 | 0.20 | 5.0 | 0/50 | good |
| 12 | 22 | 3.0 | 0.14 | 0.52 | 5.0 | 0/50 | good |
| 13 | 22 | 3.0 | 0.14 | 0.24 | 0.8 | 0/50 | good |
| 14 | 22 | 3.0 | 0.14 | 0.24 | 2.0 | 0/50 | good |
| 15 | 22 | 3.0 | 0.14 | 0.24 | 10.0 | 0/50 | good |
| 16 | 22 | 3.0 | 0.14 | 0.24 | 12.2 | 0/50 | good |
| *17 | 22 | 22.0 | 1.00 | 1.00 | 0.1 | 19/50 | insufficient |
| *18 | 22 | 22.0 | 1.00 | 1.20 | 5.0 | 21/50 | insufficient |
| *19 | 22 | 44.0 | 2.00 | 0.75 | 0.1 | 50/50 | insufficient |
| *20 | 22 | 44.0 | 2.00 | 0.85 | 5.0 | 28/50 | insufficient |

TABLE 1-continued

| Sample No. | Adhesion force test (N) | Determination of adhesion force test | Reduction in Log IR in moisture resistance reliability test (digit) | Determination of moisture resistance reliability test | Board bending resistance test (maximum amount of bending) (mm) | Determination of board bending resistance test | Comprehensive determination |
|---|---|---|---|---|---|---|---|
| 1 | 90 | fair | less than 0.1 | good | 2.7 | excellent | fair |
| 2 | 92 | fair | less than 0.1 | good | 2.6 | excellent | fair |
| 3 | 110 | good | less than 0.1 | good | 2.5 | excellent | good |
| 4 | 121 | good | less than 0.1 | good | 2.3 | good | good |
| 5 | 123 | good | less than 0.1 | good | 2.4 | good | good |
| 6 | 125 | good | less than 0.1 | good | 2.2 | good | fair |
| 7 | 122 | good | less than 0.1 | good | 2.3 | good | fair |
| 8 | 121 | good | less than 0.1 | good | 2.1 | good | good |
| 9 | 121 | good | less than 0.1 | good | 2.2 | good | good |
| 10 | 123 | good | less than 0.1 | good | 2.3 | good | good |
| 11 | 114 | good | 0.6 | fair | 2.1 | good | fair |
| 12 | 116 | good | 0.7 | fair | 2.1 | good | fair |
| 13 | 120 | good | less than 0.1 | good | 2.0 | fair | fair |
| 14 | 119 | good | less than 0.1 | good | 2.3 | good | good |
| 15 | 125 | good | less than 0.1 | good | 2.9 | excellent | good |
| 16 | 123 | good | 0.7 | fair | 2.8 | excellent | fair |
| *17 | 122 | good | 2.3 | insufficient | 1.7 | insufficient | insufficient |
| *18 | 125 | good | 2.5 | insufficient | 2.1 | good | insufficient |
| *19 | 124 | good | 2.2 | insufficient | 1.9 | insufficient | insufficient |
| *20 | 121 | good | 2.7 | insufficient | 2.1 | good | insufficient |

According to Table 1, in the samples of sample Nos. 17 to 20, the content of the glass component in the upper electrode layers was equal to the content of the glass component in the lower electrode layers, or greater than the content of the glass component in the lower electrode layers. Additionally, in the samples of sample Nos. 17 to 20, the maximum inscribed circle diameter of the pores disposed inside the upper electrode layers was greater than about 0.52 μm. Thus, both of the evaluation of the plating defect and the moisture resistance reliability test resulted in the determination of "insufficient".

Additionally, in the samples of sample Nos. 17 and 19, since the area occupation ratio of pores disposed inside the upper electrode layers was about 0.1%, which was less than about 2%, the board bending resistance test resulted in the determination of "insufficient".

On the other hand, in the samples of sample Nos. 1 to 7, since the content of the glass component in the lower electrode layers was about 22% and the content of the glass component in the upper electrode layers was in a range of about 0.2% to about 15%, the content of the glass component in the upper electrode layers was less than the content of the glass component in the lower electrode layers. Additionally, the maximum inscribed circle diameter of the pores disposed inside the upper electrode layers was greater than or equal to about 0.02 μm and less than or equal to about 0.52 μm. Thus, in the comprehensive determination for the samples of the sample Nos. 1 to 7, the determination of "good" or "fair" was given. In particular, in the comprehensive determination for the samples of sample Nos. 3 to 5, since the glass component ratio, which is the ratio of the content of the glass component in the upper electrode layers to the content of the glass component in the lower electrode layers, was greater than or equal to about 0.05 and less than or equal to about 0.28, the determination of "good" was given.

Herein, in the samples of sample Nos. 1 and 2, since the glass component ratio, which is the ratio of the content of the glass component in the upper electrode layers to the content of the glass component in the lower electrode layers, was less than about 0.05, the evaluation of the adhesion force resulted in the determination of "fair".

Additionally, in the samples of sample Nos. 6 and 7, since the glass component ratio, which is the ratio of the content of the glass component in the upper electrode layers to the content of the glass component in the lower electrode layers, was greater than about 0.28, the evaluation of the plating defect resulted in the determination of "fair".

In the samples of sample Nos. 8 to 12, the content of the glass component in the upper electrode layers was less than the content of the glass component in the lower electrode layers. Additionally, the maximum inscribed circle diameter of the pores disposed inside the upper electrode layers was greater than or equal to about 0.02 μm and less than or equal to about 0.52 μm. Thus, in the comprehensive determination for the samples of sample Nos. 8 to 12, the determination of "good" or "fair" was given. In particular, in the comprehensive determination for the samples of sample Nos. 8 to 10, since the maximum inscribed circle diameter of the pores disposed inside the upper electrode layers was greater than or equal to about 0.02 μm and less than or equal to about 0.1 μm, the determination of "good" was given.

Note that, in the samples of sample Nos. 11 and 12, since the maximum inscribed circle diameter of the pores disposed inside the upper electrode layers was greater than about 0.1 μm, the moisture resistance reliability test resulted in the determination of "fair".

In the samples of sample Nos. 13 to 16, the content of the glass component in the upper electrode layers was less than the content of the glass component in the lower electrode layers. Additionally, the area occupation ratio of the pores disposed inside the upper electrode layers was greater than or equal to about 0.8% and less than or equal to about 12.2%. Furthermore, the maximum inscribed circle diameter of the pores disposed inside the upper electrode layers was greater than or equal to 0.02 μm and less than or equal to about 0.52 μm. Thus, in the comprehensive determination for the samples of the sample Nos. 13 to 16, the determination of "good" or "fair" was given. In particular, in the comprehensive determination for the samples of sample Nos. 14 and 15, since the area occupation ratio of the pores disposed inside the upper electrode layers was greater than or equal to about 2% and less than or equal to about 10%, the determination of "good" was given.

Herein, in the sample of sample No. 13, since the area occupation ratio of the pores disposed inside the upper electrode layers was less than about 2%, the board bending resistance test resulted in the determination of "fair".

Additionally, in the sample of the sample No. 16, since the area occupation ratio of the pores disposed inside the upper electrode layers was greater than about 10%, the moisture resistance reliability test resulted in the determination of "fair".

From the above results, in the samples of sample Nos. 1 to 16, the amount of the glass component included in the upper electrode layers was less than the amount of the glass component included in the lower electrode layers, and the maximum inscribed circle diameter of the pores included in the upper electrode layers was greater than or equal to about 0.02 μm and less than or equal to about 0.52 μm, and thus, good results were obtained in all of the evaluation of the plating defect, the evaluation of the adhesion force, the moisture resistance reliability test, and the board bending resistance test.

From the above, it has been confirmed that the multilayer ceramic capacitors according to preferred embodiments of the present invention can achieve both moisture resistance and board bending resistance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including:
      a plurality of dielectric layers;
      a plurality of internal electrode layers;
      a first main surface and a second main surface facing each other in a height direction;
      a first side surface and a second side surface facing each other in a width direction orthogonal to the height direction; and
      a first end surface and a second end surface facing each other in a length direction orthogonal to the height direction and the width direction;
   a first external electrode on a side of the first end surface; and
   a second external electrode on a side of the second end surface; wherein
   the first external electrode and the second external electrode each include a lower electrode layer and an upper electrode layer on the lower electrode layer;
   the lower electrode layers include a metal component and a glass component;
   the upper electrode layers include a metal component and a glass component, and include a plurality of pores inside;
   an amount of the glass component in the upper electrode layers is less than an amount of the glass component in the lower electrode layers; and
   a maximum inscribed circle diameter of the pores in the upper electrode layers is greater than or equal to about 0.02 μm and less than or equal to about 0.52 μm.

2. The multilayer ceramic capacitor according to claim 1, wherein a ratio of a content of the glass component in the upper electrode layers to a content of the glass component in the lower electrode layers is greater than or equal to about 0.05 and less than or equal to about 0.28.

3. The multilayer ceramic capacitor according to claim 1, wherein an area occupation ratio of the pores in cross sections of the upper electrode layers is greater than or equal to about 2% and less than or equal to about 10%.

4. The multilayer ceramic capacitor according to claim 3, wherein the pores in the upper electrode layers have a circular cross-sectional shape or an elliptical cross-sectional shape.

5. The multilayer ceramic capacitor according to claim 1, wherein the maximum inscribed circle diameter of the pores in the upper electrode layers is greater than or equal to about 0.02 μm and less than or equal to about 0.1 μm.

6. The multilayer ceramic capacitor according to claim 1, wherein in interfaces between the lower electrode layers and the upper electrode layers, the pores in the upper electrode layers include the glass component.

7. The multilayer ceramic capacitor according to claim 1, wherein each of the first external electrode and the second external electrode further includes a plating layer on a corresponding one of the upper electrode layers.

8. The multilayer ceramic capacitor according to claim 1, wherein the multilayer body has a rectangular or substantially rectangular parallelepiped shape.

9. The multilayer ceramic capacitor according to claim 1, wherein the multilayer body includes rounded ridge portions and rounded corner portions.

10. The multilayer ceramic capacitor according to claim 1, wherein each of the dielectric layers has a thickness of greater than or equal to about 0.5 μm and less than or equal to about 10.0 μm.

11. The multilayer ceramic capacitor according to claim 1, wherein each of the dielectric layers includes one of $BaTiO_3$, $CaTiO_3$, $SrTiO_3$, or $CaZrO_3$.

12. The multilayer ceramic capacitor according to claim 1, wherein each of the internal electrodes includes one of Ni, Cu, Ag, Pd, Au, or an alloy including at least one of Ni, Cu, Ag, Pd, or Au.

13. The multilayer ceramic capacitor according to claim 1, wherein the multilayer body includes floating internal electrode layers that do not extend to the first end surface or the second end surface.

14. The multilayer ceramic capacitor according to claim 13, wherein the floating internal electrode layers divide counter electrode portions defined by portions of the first and second internal electrode layers facing each other with at least one of the dielectric layers therebetween.

15. The multilayer ceramic capacitor according to claim 14, wherein the floating internal electrode layers divide the counter electrode portions to define one of a double structure, a triple structure, or a quadruple structure.

16. The multilayer ceramic capacitor according to claim 1, wherein the floating internal electrode layers divide the counter electrode portions to define a plurality of capacitor components connected in series.

17. The multilayer ceramic capacitor according to claim 1, wherein the pores are irregularly positioned in the upper electrode layers.

18. The multilayer ceramic capacitor according to claim 1, wherein the lower electrode layers include pores inside.

19. The multilayer ceramic capacitor according to claim 18, wherein an area occupation ratio of the pores in cross sections of the lower electrode layers is less than or equal to about 2% and greater than 0%.

20. The multilayer ceramic capacitor according to claim 1, wherein each of the first external electrode and the second external electrode further includes a first plating layer on a corresponding one of the upper electrode layers and a second plating layer on the first plating layer and made of different materials.

* * * * *